(12) United States Patent
Inaba et al.

(10) Patent No.: US 11,154,803 B2
(45) Date of Patent: Oct. 26, 2021

(54) ELECTRET FIBER SHEET

(71) Applicant: Toray Industries, Inc., Tokyo (JP)

(72) Inventors: Sachio Inaba, Otsu (JP); Yuji Iyama, Otsu (JP); Takuji Kobayashi, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 16/466,347

(22) PCT Filed: Dec. 4, 2017

(86) PCT No.: PCT/JP2017/043432
§ 371 (c)(1),
(2) Date: Jun. 4, 2019

(87) PCT Pub. No.: WO2018/105546
PCT Pub. Date: Jun. 14, 2018

(65) Prior Publication Data
US 2020/0078717 A1    Mar. 12, 2020

(30) Foreign Application Priority Data

Dec. 8, 2016    (JP) .............................. JP2016-238294

(51) Int. Cl.
*B01D 39/16*    (2006.01)
*D04H 1/4291*    (2012.01)
(52) U.S. Cl.
CPC ....... *B01D 39/1623* (2013.01); *D04H 1/4291* (2013.01); *B01D 2239/0435* (2013.01);
(Continued)

(58) Field of Classification Search
None
See application file for complete search history.

(56) References Cited

U.S. PATENT DOCUMENTS 5,409,766 A * 4/1995 Yuasa ................ B01D 39/1623
442/361
6,110,251 A    8/2000 Jackson et al.
(Continued)

FOREIGN PATENT DOCUMENTS

CN    103046231 A    4/2013
CN    103717796 A    4/2014
(Continued)

OTHER PUBLICATIONS

Kilic et al., "Aerosol Filtration Properties of Nucleating Agent Containing Electret Filters", Polymer Engineering and Science, 2014, vol. 54, No. 7, pp. 1533-1539.
(Continued)

*Primary Examiner* — Marla D McConnell
*Assistant Examiner* — Kevin Worrell
(74) *Attorney, Agent, or Firm* — Ratnerprestia

(57) ABSTRACT

The present invention provides an electret fiber sheet having superior recovery of airflow volume by heat treatment and having high air permeability. The electret fiber sheet of the present invention is a nonwoven fabric formed from long fibers that are formed from a thermoplastic resin and have an average single fiber diameter of 0.1 to 8.0 μm, wherein a bulk density of the nonwoven fabric is 0.05 to 0.30 g/cm$^3$ and the long fibers contain a crystal nucleating agent at 0.005 to 1.0% by mass.

3 Claims, 1 Drawing Sheet

(52) U.S. Cl.
CPC ............ *B01D 2239/064* (2013.01); *B01D 2239/0618* (2013.01); *B01D 2239/0622* (2013.01); *B01D 2239/1233* (2013.01)

(56) References Cited

U.S. PATENT DOCUMENTS

| | | | |
|---|---|---|---|
| 6,119,691 | A | 9/2000 | Angadjivand et al. |
| 8,415,416 | B2 | 4/2013 | Chin et al. |
| 9,662,601 | B2 | 5/2017 | Matsuda et al. |
| 2005/0176325 | A1 | 8/2005 | Tokuda et al. |
| 2007/0235903 | A1* | 10/2007 | Chin .............. H01G 7/023 264/436 |
| 2008/0249269 | A1* | 10/2008 | Chin .............. H01G 7/023 526/208 |
| 2013/0059979 | A1* | 3/2013 | Eswaran .......... C08L 23/142 525/194 |
| 2017/0260129 | A1* | 9/2017 | Schmidt .......... C07C 233/62 |
| 2020/0078717 | A1 | 3/2020 | Inaba et al. |

FOREIGN PATENT DOCUMENTS

| | | |
|---|---|---|
| EP | 1510241 A1 | 3/2005 |
| JP | 61289177 A | 12/1986 |
| JP | 63151326 A | 6/1988 |
| JP | 63280408 A | 11/1988 |
| JP | 06128858 A | 5/1994 |
| JP | 2543548 B2 * | 10/1996 |
| JP | 2543548 B2 | 10/1996 |
| JP | 1046460 A | 2/1998 |
| JP | 2003003367 A | 1/2003 |
| JP | 2004058048 A | 2/2004 |
| JP | 2004066026 A | 3/2004 |
| JP | 2004344756 A | 12/2004 |
| JP | 2004344776 A | 12/2004 |
| JP | 2005218930 A | 8/2005 |
| JP | 2006037295 A | 2/2006 |
| JP | 2009533505 A | 9/2009 |
| JP | 2012239995 A | 12/2012 |
| JP | 2015193959 A | 11/2015 |
| JP | 2016065335 A | 4/2016 |
| WO | 2007115963 A1 | 10/2007 |
| WO | 2018105546 A1 | 6/2018 |

OTHER PUBLICATIONS

European Communication Pursuant to Rules 70(2) and 70a(2), dated Jul. 23, 2020, 8 pages.
Japanese Notice of Reasons for Refusal for Japanese Application No. 2016-238294, dated Jul. 30, 2020 with translation, 8 pages.
International Search Report and Written Opinion for International Application No. PCT/JP2017/043432, dated Feb. 20, 2018—4 pages.
Chinese Office Action for Chinese Application No. 201780074811.8, dated Dec. 29, 2020 with translation, 9 pages.
Japanese Submission of Publication for Japanese Application No. 2016-238294, dated Jan. 12, 2021 with translation, 5 pages.
Japanese Submission of Publication for Japanese Application No. 2016-238294, dated Feb. 9, 2021 with translation, 5 pages.
Indonesian Substantive Examination for Indonesian Application No. P00201905668, dated Jun. 14, 2021, with translation, 4 pages.
Japanese Notice of Reasons for Refusal for Japanese Application No. 2016-238294, dated Mar. 23, 2021, with translation, 8 pages.
Chinese Office Action for Chinese Application No. 201780074811.8, dated Jul. 9, 2021, with translation, 9 pages.
Hongbing, J., "Polymer Materials," Nov. 2009, 6 pages. Nanjing University Press, with partial English translation.

* cited by examiner

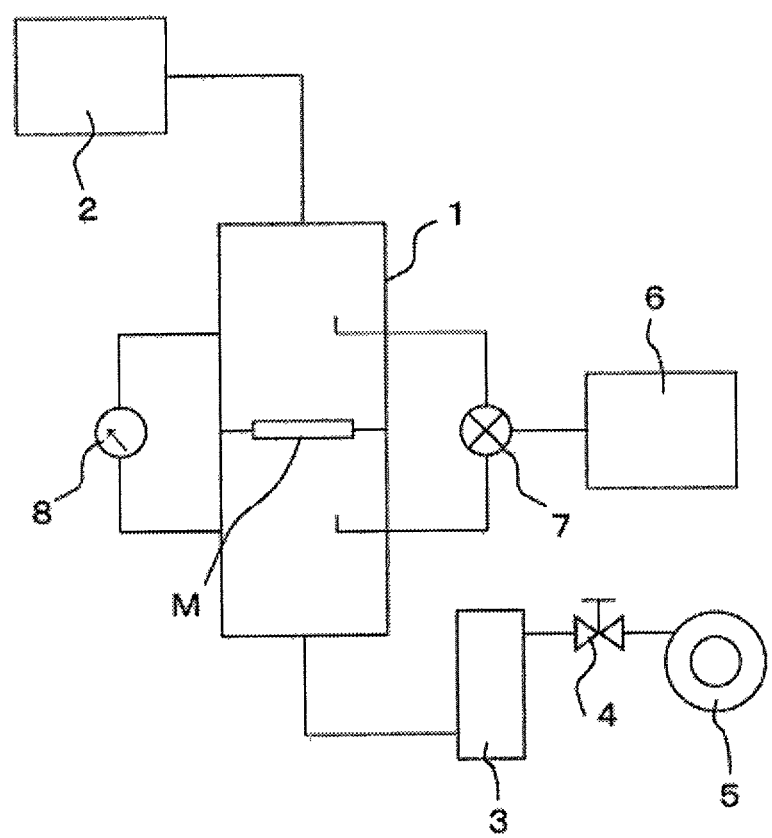

ELECTRET FIBER SHEET

CROSS REFERENCE TO RELATED APPLICATIONS

This is the U.S. National Phase application of PCT/JP2017/043432, filed Dec. 4, 2017, which claims priority to Japanese Patent Application No. 2016-238294, filed Dec. 8, 2016, the disclosures of each of these applications being incorporated herein by reference in their entireties for all purposes.

FIELD OF THE INVENTION

The present invention relates to electret fiber sheets. More specifically, the present invention relates to an electret fiber sheet superior in air permeability and a filter medium that is produced using the electret fiber sheet and is to be suitably used for air filters.

BACKGROUND OF THE INVENTION

Air filters are conventionally used to remove pollen, dust, and the like from the air, and nonwoven fabrics are often used as filter media for air filters. Among others, a melt blowing method, which is one of the methods for producing nonwoven fabrics, is widely used for the production of a filter medium of air filter products, battery separators, etc. A melt blowing method is generally a method in which hot air is blown over a thermoplastic polymer extruded from a spinneret, whereby the polymer is formed into fine fibers, and the obtained fibers have self-bonding characteristics which are utilized to form the fibers into a fiber web.

As compared with other methods for producing a nonwoven fabric such as a spun bonding method, the melt blowing method is a method having the advantages of requiring no complicated steps and being capable of easily affording fine fibers having a single fiber diameter of several tens of micrometers to several micrometers or less.

The performance required for air filters includes high dust collection efficiency that enables the collection of a large amount of micro dust and low pressure loss that is due to low resistance to airflow passing through an air filter. In order to provide a filter medium having the high dust collection efficiency, a nonwoven fabric composed of single fibers having a smaller fineness is suitable, but single fibers formed to have a smaller fineness are likely to cause such a nonwoven fabric composed of the single fibers to easily collapse and increase the fiber density of the nonwoven fabric, resulting in causing an increased pressure loss.

In addition, in order to provide a filter medium that exhibits low pressure loss, a nonwoven fabric composed of single fibers having a thick fineness is suitable, but single fibers formed to have a thicker fineness reduce the fiber surface area of such a nonwoven fabric, problematically resulting in decreasing the dust collection efficiency. Thus, in the performance required for air filters in the prior art, having high dust collection efficiency is incompatible with having low pressure loss.

To solve the above problem, an attempt has been made to satisfy both high dust collection efficiency and low pressure loss by electretizing a nonwoven fabric and utilizing not only the physical action but also the electrostatic action.

For example, there has been proposed a method of producing electret fiber sheets, the method including: applying a high voltage to a nonwoven fabric by a non-contact voltage applying electrode with the nonwoven fabric being kept in contact with a ground electrode while moving the ground electrode and the nonwoven fabric together, thereby continuously electretizing the fabric (see Patent Document 1). Besides, as a method of charging a fiber by bringing it into contact with water, there have been proposed so-called hydrocharge methods such as a method in which a fiber sheet is electretized by spraying water onto the sheet using water jet streams or water droplet streams with a pressure high enough for the water to permeate into the nonwoven fabric, so that the fiber sheet is made to have positive, charge and negative charge evenly mixed (see Patent Document 2) and a method in which a fiber sheet is passed over a slit nozzle and water is sucked through the nozzle to permeate into the fiber sheet, so that the fiber sheet is made to have positive charge and negative charge evenly mixed (see Patent Document 3).

Moreover, there has been proposed a method of obtaining a nonwoven fabric having high dust collection efficiency and low pressure loss by adding additives to fibers constituting a nonwoven fabric, and specifically there has been proposed a heat-resistant electret material made of a material prepared by mixing at least one stabilizer selected from among hindered amine stabilizers, nitrogen-containing hindered phenol stabilizers, metal salt hindered phenol stabilizers and phenol stabilizers with a high molecular weight polymer, wherein the material has a trap charge amount of $2.0 \times 10^{-10}$ coulomb/cm$^2$ from a thermal stimulus removing polarizing current at a temperature of 100° C. or more (see Patent Document 4).

Furthermore, there has been proposed a method of suppressing rise of pressure loss by forming a nonwoven fabric composed of thin fibers and thick fibers mixed together and thus inhibiting clogging with particles to increase voids between fibers (see Patent Document 5 and Patent Document 6).

PATENT DOCUMENTS

Patent Document 1: Japanese Patent Laid-open Publication No. Sho 61-289177
Patent Document 2: U.S. Pat. No. 6,119,691
Patent Document 3: Japanese Patent Laid-open Publication No. 2003-3367
Patent Document 4: Japanese Patent Laid-open Publication No. Sho 63-280408
Patent Document 5: Japanese Patent Laid-open Publication No. Hei 10-46460
Patent Document 6: Japanese Patent Laid-open Publication No. 2006-37295

SUMMARY OF THE INVENTION

As proposed in the descriptions of Patent Documents 1 to 6, the dust collection performance of a nonwoven fabric is improved by electretizing it. However, when a nonwoven fabric is used as an ordinary filter medium for a filter, since the nonwoven fabric is wound with tension into a roll form in various steps such as shaping process or functionalizing process or the nonwoven fabric is pressed with a roll, the thickness of the fabric is reduced, so that pressure loss as a filter increases and therefore a sufficient effect of suppressing increase in pressure loss cannot be obtained.

In view of the problems of the conventional nonwoven fabrics, it is an object of the present invention to provide an electret fiber sheet having superior recovery of airflow volume by heat treatment and having high air permeability.

Another object of the present invention is to provide a filter medium that is produced using the above-mentioned electret fiber sheet having high air permeability and is suitably used for air filters.

The present invention intends to solve the problems described above, and the electret fiber sheet according to embodiments of the present invention is a nonwoven fabric formed from long fibers that are formed from a thermoplastic resin and have an average single fiber diameter of 0.1 to 8.0 μm, wherein a bulk density of the nonwoven fabric is 0.05 to 0.30 g/cm$^3$ and the long fibers contain a crystal nucleating agent at 0.005 to 1.0% by mass.

According to a preferred embodiment of the electret fiber sheet of the present invention, the long fibers are formed from a thermoplastic resin mainly including a polypropylene resin.

According to another preferred embodiment of the electret fiber sheet of the present invention, the nonwoven fabric has a rate of increase in airflow volume after heat treatment at a temperature of 100° C. of 130% or more.

By using the electret fiber sheet of the present invention, an air filter medium formed from the electret fiber sheet can be produced.

According to the present invention, it is possible to obtain an electret fiber sheet having superior recovery of airflow volume by heat treatment and having high air permeability by heat treatment even when the airflow volume is reduced in such a step as shaping process, etc. By using the electret fiber sheet of the present invention, an air filter medium superior in air permeability can be obtained.

BRIEF DESCRIPTION OF DRAWINGS

The FIG. is a schematic side view for illustrating a dust collection efficiency measuring device for measuring dust collection efficiency.

DETAILED DESCRIPTION OF EMBODIMENTS OF THE INVENTION

The electret fiber sheet according to embodiments of the present invention is an electret fiber sheet which is a nonwoven fabric formed from long fibers that are formed from a thermoplastic resin and have an average single fiber diameter of 0.1 to 8.0 μm, wherein a bulk density of the nonwoven fabric is 0.05 to 0.30 g/cm$^3$ and the long fibers contain a crystal nucleating agent at 0.005 to 1.0% by mass.

In a preferred embodiment, the electret fiber sheet of the present invention is formed from a thermoplastic resin and mainly includes nonconductive fibers. The nonconductivity as referred to herein preferably means a volume resistivity of $10^{12} \cdot \Omega \cdot cm$ or more, more preferably $10^{19} \cdot \Omega \cdot cm$ or more.

In the present invention, "mainly include nonconductive fibers" means to contain 90% by mass or more of nonconductive fibers in the electret fiber sheet. The content of the nonconductive fibers is preferably 95% by mass or more, more preferably 97% by mass or more. If the content of the nonconductive fibers in the electret fiber sheet is less than 90% by mass, sufficient electret performance cannot be obtained.

Examples of the fiber material of the nonconductive fiber to be used in embodiments of the present invention include polyolefin resins such as polyethylene and polypropylene; polyester resins such as polyethylene terephthalate, polytrimethylene terephthalate, polybutylene terephthalate, and polylactic acid; polycarbonate resins; polystyrene resins; polyphenylene sulfide resins; fluororesins; elastomers such as polystyrene elastomer, polyolefin elastomer, polyester elastomer, polyamide elastomer, and polyurethane elastomer; and resins formed of copolymers or mixtures thereof.

Among these, polyolefin resins are preferably used. Since polyolefin resins exhibit a strong charging property and a strong charge retention property due to their high volume resistivity and low water absorption when a melt blown nonwoven fabric thereof is electretized, high dust collection efficiency can be achieved due to those effects.

As a method of electretization to be used in the method of producing the electret fiber sheet of the present invention, a method of performing electretization by imparting water to a nonconductive fiber sheet and then drying is preferably used.

Examples of polyolefin resins include homopolymers such as polyethylene, polypropylene, polybutene, and polymethylpentene. In addition, copolymers in which such a homopolymer is copolymerized with a different component, or polymer blends of two or more different polymers can also be used. Among these, polypropylene resin and polymethylpentene are preferably used from the viewpoint of electrification retention property. In addition, polypropylene resin is preferably used from the viewpoint that it can be used at low cost.

The electret fiber sheet according to embodiments of the present invention is a nonwoven fabric formed from long fibers having an average single fiber diameter of 0.1 to 8.0 μm. When the average single fiber diameter is adjusted more preferably to 0.3 to 7.0 μm, even more preferably to 0.5 to 5.0 μm, an electret fiber sheet superior in air permeability and dust collection characteristics can be obtained. If the average single fiber diameter is less than 0.1 μm, voids in the melt blown nonwoven fabric do not expand, so that sufficient air permeability cannot be obtained. If the average single fiber diameter exceeds 8.0 μm, the fiber surface area in the melt blown nonwoven fabric decreases, so that sufficient dust collection efficiency cannot be obtained when used as an air filter medium.

The electret fiber sheet of the present invention preferably has a basis weight in a range of 3 to 100 g/m$^2$. By adjusting the basis weight to 3 to 100 g/m$^2$, preferably 5 to 70 g/m$^2$, more preferably 10 to 50 g/m$^2$, it becomes easier to obtain an electret fiber sheet superior in air permeability and dust collection characteristics.

In the electret fiber sheet of the present invention, the bulk density thereof is preferably in a range of 0.05 to 0.30 g/cm$^3$, more preferably 0.07 to 0.25 g/cm$^3$. When the bulk density is less than 0.07 g/cm$^3$, this means that the thickness is high within the above range of the basis weight, and when pleating process is applied in order to use the electret fiber sheet as an air filter, the nonwoven fabric curves between the top of a mountain and the bottom of a valley, so that a dead space increases and pressure loss sometimes increases. When the bulk density exceeds 0.30 g/cm$^3$, voids in the electret fiber sheet become small, so that sufficient air permeability is not obtained in some cases.

The electret fiber sheet according to embodiments of the present invention contains 0.005 to 1.0% by mass, preferably 0.007 to 0.5% by mass, of a crystal nucleating agent in the long fibers constituting the nonwoven fabric. By containing the crystal nucleating agent, spun fibers is allowed to rapidly solidify, so that bonding of the fibers is reduced and the air permeability is improved. Further, by performing the electretization treatment, it is possible to obtain an electret fiber sheet having superior dust collection characteristics.

The content referred to herein can be determined, for example, as follows. A nonwoven fabric is Soxhlet extracted with a methanol/chloroform mixed solution, and then the extract is subjected to HPLC fractionation repeatedly and the structure of each of the fractions are confirmed by IR measurement, GC measurement, GC/MS measurement, MALDI-MS measurement, $^1$H-NMR measurement and $^{13}$C-NMR measurement. The masses of the fractions containing a crystal nucleating agent are totaled to determine the ratio of the total to the whole nonwoven fabric, which is taken as the content of the crystal nucleating agent.

If the content of the crystal nucleating agent is less than 0.005% by mass, the rate of increase in airflow volume during heat treatment is small. On the other hand, if the content of the crystal nucleating agent exceeds 1.0% by mass, spinnability deteriorates or it is disadvantageous in cost aspect.

Examples of the crystal nucleating agent include sorbitol-based nucleating agents, nonitol-based nucleating agents, xylitol-based nucleating agents, phosphoric acid-based nucleating agents, triaminobenzene derivative nucleating agents, and metal carboxylate nucleating agents.

Examples of the sorbitol-based nucleating agent include dibenzylidenesorbitol (DBS), monomethyldibenzylidenesorbitol (for example, 1,3:2,4-bis(p-methylbenzylidene)sorbitol (p-MDBS)), and dimethyldibenzylidenesorbitol (for example, 1,3:2,4-bis(3,4-dimethylbenzylidene)sorbitol (3,4-DMDBS)), and specifically include "Millad" (registered trademark) 3988 (produced by Milliken Japan K.K.) and "Gelol" (registered trademark) E-200 (produced by New Japan Chemical Co., Ltd.).

Examples of the nonitol-based nucleating agent include 1,2,3-trideoxy-4,6: 5,7-bis-[(4-propylphenyl)methylene]-nonitol, and specifically include "Millad" NX 8000 (produced by Milliken Japan K.K.).

Examples of the xylitol-based nucleating agent include bis-1,3:2,4-(5',6',7',8'-tetrahydro-2-naphthaldehydebenzylidene) 1-allylxylitol. Examples of the phosphoric acid-based nucleating agent include aluminum-bis(4,4',6,6'-tetra-tert-butyl-2,2'-methylenediphenyl-phosphato)-hydroxide, and specifically include "ADK STAB" (registered trademark) NA-11 (produced by ADEKA Corporation) and "ADK STAB" (registered trademark) NA-21 (produced by ADEKA Corporation).

Examples of the triaminobenzene derivative nucleating agent includes 1,3,5-tris(2,2-dimethylpropanamido)benzene, and specifically include "Irgaclear" (registered trademark) XT 386 (produced by BASF Japan Ltd.). Moreover, examples of the metal carboxylate nucleating agent includes sodium benzoate and calcium 1,2-cyclohexanedicarboxylate.

In the electret fiber sheet of the present invention, additives such as a heat, stabilizer, a weathering agent and a polymerization inhibitor may be added in addition to the crystal nucleating agent, and from the viewpoint of improving the electret performance when electretizing a melt blown nonwoven fabric, it is a preferred embodiment to incorporate at least one species of hindered amine additives and/or triazine additives in the fiber material.

Examples of the hindered amine compounds include poly[(6-(1,1,3,3-tetramethylbutyl)imino-1,3,5-triazine-2,4-diyl)((2,2,6,6-tetramethyl-4-piperidyl)imino)hexamethylene((2,2,6,6-tetramethyl-4-piperidyl)imino)]("Chimassorb" (registered trademark) 944LD, produced by BASF Japan Ltd.), a polycondensate of dimethyl succinate with 1-(2-hydroxyethyl)-4-hydroxy-2,2,6,6-tetramethylpiperidine ("Tinuvin" (registered trademark) 622LD, produced by BASF Japan Ltd.), and bis(1,2,2,6,6-pentamethyl-4-piperidyl)-2-(3,5-di-t-butyl-4-hydroxybenzyl)-2-n-butylmalonate ("Tinuvin" (registered trademark) 144, produced by BASF Japan Ltd.).

Examples of the triazine additives include poly[(6-(1,1,3,3-tetramethylbutyl)imino-1,3,5-triazine-2,4-diyl)((2,2,6,6-tetramethyl-4-piperidyl)imino)hexamethylene((2,2,6,6-tetramethyl-4-piperidyl)imino)]("Chimassorb" (registered trademark) 944LD, produced by BASF Japan Ltd.), and 2-(4,6-diphenyl-1,3,5-triazine-2-yl)-5-((hexyl)oxy)-phenol ("Tinuvin" (registered trademark) 1577FF, produced by BASF Japan Ltd.).

The addition amount of the hindered amine additive and/or the triazine additive is preferably 0.5 to 5% by mass, more preferably 0.7 to 3% by mass based on the mass of the melt blown nonwoven fabric. By adjusting the addition amount to within this range, it becomes easy to acquire superior dust collection characteristics when having performed electretization.

Next, a method of producing the electret fiber sheet of the present invention will be described. The electret fiber sheet of the present invention can be obtained by electretizing a melt blown nonwoven fabric.

The melt blown nonwoven fabric of the present invention can be produced, for example, by the method described below.

First, a thermoplastic resin material and additives are kneaded together, then melted in an extruder and supplied to a spinneret part, and then a nonwoven fabric is produced by a melt blowing method. Examples of a method of kneading the thermoplastic resin material and the additives include a method of mixing and feeding them to a extruder hopper of a spinning machine, kneading them in the extruder, and feeding them directly to a spinneret, and a method of previously kneading the thermoplastic resin material and the additives with a kneading extruder, a static kneader or the like to prepare a master chip.

The melt blowing method requires no complicated steps and is capable of affording fine fibers as thin as several micrometers, and the method can makes it easy to achieve high dust collection characteristics.

Subsequently, the melt blown nonwoven fabric is subjected to electretization treatment. The electretization treatment can be performed either for a melt blown nonwoven fabric single layer or for a laminated fiber melt blown nonwoven fabric laminated with another sheet.

As an electretization method of the electret fiber sheet of the present invention, for example, a method of performing electretization by imparting water to a fiber sheet and then drying is preferably used. Examples of a method of imparting water to a fiber sheet include a method of spraying water jet streams or water droplet streams with a pressure high enough for the water to permeate into the fiber sheet, a method of forcing water to permeate into a fiber sheet by sucking from one side of the fiber sheet after or while imparting water, and a method of immersing a fiber sheet in a mixed solution of a water-soluble organic solvent such as isopropyl alcohol, ethyl alcohol and acetone and water, thereby allowing water to permeate into the fiber sheet.

In the present invention, the water to be used in electretization is preferably water that has been rid of dirt with a liquid filter or the like and that is as clean as possible. In particular, pure water such as ion-exchanged water, distilled water, and filtrate water that has passed through a reverse osmosis membrane is preferably used. The level of pure water is preferably a conductivity of $10^3$ μS/m or less, more preferably $10^2$ μS/m or less. The above-described water can be mixed with a water-soluble organic solvent to the extent that the dust collection characteristics are not adversely affected.

In a preferred embodiment of the electret fiber sheet of the present invention, the rate of increase in airflow volume after performing heat treatment at a temperature of 100° C. is 130% or more, and more preferably 132% or more. Bringing the rate of increase in airflow volume after performing heat treatment at a temperature of 100° C. within this range can make it easy to obtain an air filter medium having high air permeability.

The air filter medium of the present invention is formed from the electret fiber sheet of the present invention. As a method of obtaining the air filter medium of the present invention from the electret fiber sheet of the present invention, a method of bonding a nonwoven fabric and a sheet having a higher rigidity than the nonwoven fabric by spraying a moisture-curable urethane resin or the like, or a method of bonding the nonwoven fabric and the aforementioned sheet by spraying a thermoplastic resin or heat bondable fibers and passing them through a heat path (for example, the method described in Japanese Patent Laid-open Publication No. 2004-82109) can be used.

The air filter medium of the present invention can be used as a filter unit by being incorporated in a sheet form into a frame. In the present invention, the air filter medium can also be used as a pleated filter unit set in a frame by performing pleating process by repeating mountain folding and valley folding.

The air filter medium of the present invention is suitable for air filters in general and is especially suitable for high-performance applications such as filters for air conditioners, filters for air cleaners, and automotive cabin filters.

EXAMPLES (1) Basis Weight of Electret Fiber Sheet:

The mass of one sample of an electret fiber sheet having 15 cm in length and 15 cm in width was measured. The measurement was converted into a value per 1 $m^2$, which was then rounded off to the first decimal place to calculate the basis weight (g/$m^2$) of the electret fiber sheet.

(2) Average Single Fiber Diameter:

For an average single fiber diameter, 10 measurement samples each sized 3 mm×3 mm were cut out of an arbitrary area of an electret fiber sheet, the fiber surfaces of the samples were observed with a scanning electron microscope adjusted at a magnification of 1000 to 3000 times, and one photograph was taken for each sample (10 photographs in total). Fibers whose diameters (single fiber diameters) were clearly observed in the photographs were measured, and the averaged value of the measurements was rounded off to the second decimal place and taken as an average single fiber diameter.

(3) Thickness of Electret Fiber Sheet:

Using a thickness gauge ("TECLOCK" (registered trademark) SM-114 manufactured by TECLOCK Corporation), the thickness of an electret fiber sheet was measured at ten points at equal intervals in the width direction, and the average value of the measurements was rounded off to the third decimal place and taken as a thickness (mm).

(4) Bulk Density of Electret Fiber Sheet:

The bulk density (g/$cm^3$) of the electret fiber sheet before and after heat treatment was calculated from the following formula using the values of the basis weight and the thickness determined in the above (1) and (3).

Bulk density=[basis weight (g/$m^2$)/(thickness (mm)× 1000)]

(5) Airflow Volume of Electret Fiber Sheet:

Using an airflow volume measuring device (FX3300 manufactured by TEXTEST, LLC), the airflow volume of an electret fiber sheet was measured at three points under the conditions specified by a measurement pressure of 125 Pa and a measurement area of 38 $cm^2$, and the average value of the measurements was rounded off to the second decimal place and taken as an airflow volume (cc/$cm^2$/sec).

(5) Rate (%) of Increase in Airflow Volume After Heat Treatment at 100° C.:

At three points aligned in the longitudinal direction of an electret fiber sheet, measurement samples each having 15 cm in length and 15 cm in width were taken, and each of the samples was sandwiched between smooth metal plates and then a load of 10 kg/$cm^2$ was applied thereto at room temperature for 1 minute using a hydraulic pressing device. Then, the sample was heat treated for 5 minutes while being hung in a hot air dryer (TABAI PHH-100, manufactured by ESPEC Corporation) set at a temperature of 100° C. The airflow volume of the electret fiber sheet was measured before and after the heat treatment and the rate of increase in airflow volume after the heat treatment at a temperature of 100° C. was calculated from the following equation. The average value of the three measurement samples was taken as a final rate of increase in airflow volume after the heat treatment.

Rate of increase in airflow volume after heat treatment=[(airflow volume after heat treatment/airflow volume before heat treatment)]×100.

(6) Dust Collection Performance (Dust Collection Efficiency and Pressure Loss) of Electret Fiber Sheet:

At five points aligned in the width direction of an electret fiber sheet, measurement samples each having 15 cm in length and 15 cm in width were taken, and then dust collection efficiency was measured for each of the samples using a dust collection efficiency measuring device shown in the FIG. The dust collection efficiency measuring device of the FIG. includes a sample holder 1 for holding a measurement sample M, the upstream of the sample holder 1 is connected to a dust storing box 2, and the downstream of the sample holder 1 is connected to a flow meter 3, a flow control valve 4, and a blower 5. The sample holder 1 is equipped with a particle counter 6 and the number of dust particles can be counted at each of the upstream and downstream sides of the measurement sample M by operating a switch cock 7. The sample holder 1 is also equipped with a pressure gauge 8, which can indicate the static pressure difference between the upstream side and the downstream side of the measurement sample M.

In the measurement of dust collection efficiency, a 10% solution of polystyrene 0.309U (produced by Nacalai Tesque, Inc.) is diluted 200-fold with distilled water and placed in the dust storing box 2. Next, the measurement sample M was placed in the sample holder 1. Airflow was adjusted with the flow control valve 4 such that the air passed through the filter at a velocity of 4.5 m/minute. The dust concentration was maintained within a range of 10,000 to 40,000 particles/2.83×$10^{-4}$ $m^3$ (0.01 $ft^3$). The number of dust particles at the upstream side (D) and the number of dust particles at the downstream side (d) were measured for the measurement sample M using the particle counter 6 (KC-01D manufactured by RION Co., Ltd.). The measurement was repeated three times for each sample. The dust collection efficiency (%) for particles having a diameter of 0.3 to 0.5 µm was calculated using the following expression based on JIS K 0901(1991) "Form, size and performance testing methods of filtration media for collecting airborne particulate matters". The average value of the three measurement samples was taken as a final dust collection efficiency.

Dust collection efficiency (%)=[1−(d/D)]×100 wherein d represents the total of the numbers of dust particles at the downstream side in three measurements, and D represents the total of the numbers of dust particles at the upstream side in three measurements.

The more collective a nonwoven fabric, the smaller the number of dust particles at the downstream and, therefore, the higher the value of the dust collection efficiency. A pressure loss was determined by reading the static pressure difference between the upstream side and the downstream side of the measurement sample M in dust collection efficiency measurement with the pressure gauge 8. The average value of five measurement samples was taken as a final pressure loss.

Example 1

As a thermoplastic resin raw material, there was used a polypropylene resin with a melt flow rate of 850 g/10 minutes containing 0.15% by mass of "ADK STAB" (registered trademark) NA-21 (produced by ADEKA Corporation) and 1% by mass of a hindered amine compound "Chimassorb" (registered trademark) 944 (produced by BASF Japan Ltd.).

The polypropylene resin raw material was fed into a raw material hopper of a spinning machine. Then, using a spinneret with orifices having diameters of 0.4 mm and orifices having diameters of 0.6 mm arranged alternately on a straight line (orifice pitch: 1.6 mm, the number of orifices: 94, width: 150 mm), the raw material was sprayed by a melt blowing method under conditions specified by a polymer mass throughput of 32 g/minute, a nozzle temperature of 265° C., an air temperature of 290° C., and an air pressure of 0.10 MPa. At an adjusted collecting conveyor speed, a melt blown nonwoven fabric having a basis weight of 25 g/m² was obtained. Subsequently, while moving the resulting nonwoven fabric sheet along the surface of water in a water tank to which pure water was being supplied, a slit suction nozzle was held in contact with the surface of the sheet and the water was sucked, so that the water was forced to permeate to the whole fiber sheet. The water was drained and then the fiber sheet was allowed to dry, and thus an electretized melt blown nonwoven fabric (electret fiber sheet) was obtained.

The resultant electret fiber sheet was pressed at room temperature under a load of 10 kgf/cm² for 1 minute and then heat treated for 5 minutes in a hot air dryer set at a temperature of 100° C., and the airflow volume before and after the heat treatment was measured, and the rate of increase in airflow volume was calculated. The measured values and the calculated value of the electret fiber sheet are shown in Table 1.

Example 2

An electret fiber sheet was obtained in the same manner as in Example 1 except that the amount of NA-21 used in Example 1 was changed to 0.60% by mass as a thermoplastic resin raw material.

The characteristic values of the resultant electret fiber sheet were measured by the same method as in Example 1. The results obtained are shown in Table 1.

Example 3

An electret fiber sheet was obtained in the same manner as in Example 1 except that 0.01% by mass of "Irgaclear" (registered trademark) XT 386 (produced by BASF Japan Ltd.) was added as a thermoplastic resin raw material.

The characteristic values of the resultant electret fiber sheet were measured by the same method as in Example 1. The results obtained are shown in Table 1.

Example 4

An electret fiber sheet was obtained in the same manner as in Example 3 except that 0.03% by mass of Irgaclear XT386 used in Example 3 was added as a thermoplastic resin raw material.

The characteristic values of the resultant electret fiber sheet were measured by the same method as in Example 1. The results obtained are shown in Table 1.

Comparative Example 1

An electret fiber sheet was obtained in the same manner as in Example 1 except that NA-21 was not added to the polypropylene used in Example 1 as a thermoplastic resin raw material.

The characteristic values of the resultant electret fiber sheet were measured by the same method as in Example 1. The results obtained are shown in Table 1.

TABLE 1

|  |  | Example 1 | Example 2 | Example 3 | Example 4 | Comparative Example 1 |
|---|---|---|---|---|---|---|
| Raw material of thermoplastic resin | — | PP | PP | PP | PP | PP |
| Type of crystal nucleating agent | — | NA-21 | NA-21 | Irgaclear XT386 | Irgaclear XT386 | — |
| Addition amount of crystal nucleating agent | % by mass | 0.15 | 0.60 | 0.01 | 0.03 | — |
| Basis weight | g/m² | 25 | 25 | 25 | 25 | 25 |
| Average single fiber diameter | μm | 1.8 | 1.9 | 1.9 | 1.8 | 1.8 |
| Pressing Pressure | kgf/cm² | 10 | 10 | 10 | 10 | 10 |
| Airflow volume before heat treatment | cc/cm²/sec | 13.5 | 16.8 | 16.0 | 16.0 | 14.8 |
| Airflow volume after heat treatment | cc/cm²/sec | 18.1 | 22.3 | 21.4 | 21.8 | 18.9 |
| Rate of increase in airflow volume after heat treatment | % | 134 | 133 | 134 | 136 | 128 |
| Thickness before heat treatment | mm | 0.15 | 0.15 | 0.15 | 0.15 | 0.14 |

TABLE 1-continued

|  |  | Example 1 | Example 2 | Example 3 | Example 4 | Comparative Example 1 |
|---|---|---|---|---|---|---|
| Thickness after heat treatment | mm | 0.18 | 0.18 | 0.19 | 0.18 | 0.15 |
| Bulk density before heat treatment | g/cm³ | 0.16 | 0.17 | 0.16 | 0.16 | 0.18 |
| Bulk density after heat treatment | g/cm³ | 0.14 | 0.14 | 0.13 | 0.14 | 0.17 |
| Pressure loss after heat treatment | Pa | 43.2 | 36.1 | 38.2 | 37.3 | 45.8 |
| Dust collection efficiency after heat treatment | % | 99.836 | 99.712 | 99.801 | 99.843 | 99.646 |

As is apparent from Table 1, in Examples 1 to 4 of the present invention, since crystal nucleating agents were contained in the range of 0.01 to 0.3% by mass, nonwoven fabrics each having a recovery of airflow volume of 130% or more were obtained by performing heat treatment even though they were pressed electret fiber sheets.

On the contrary, in Comparative Example 1 containing no crystal nucleating agents, the rate of increase in airflow volume after heat treatment was less than 130% unlike Examples 1 to 4 and the pressed electret fiber sheet exhibited a small recovery of airflow volume.

As described above, the present invention has made it possible to obtain electret fiber sheets superior in airflow volume recovery due to heat treatment by containing a crystal nucleating agent and limiting the fiber diameter and the bulk density to within specified ranges.

DESCRIPTION OF REFERENCE SIGNS

1: Sample holder
2: Dust storing box
3: Flow meter
4: Flow control valve
5: Blower
6: Particle counter
7: Switch cook
8: Pressure gauge
M: Measurement sample

The invention claimed is:

1. An electret fiber sheet which is an electretized nonwoven fabric formed from long fibers that are formed from a thermoplastic resin and have an average single fiber diameter of 0.1 to 8.0 μm, wherein a bulk density of the nonwoven fabric is 0.05 to 0.30 g/cm³ and the long fibers contain a crystal nucleating agent at 0.005 to 1.0% by mass, wherein the crystal nucleating agent is a triaminobenzene derivative nucleating agent, wherein the electretized nonwoven fabric is obtained by hydrocharqinq a nonwoven fabric by imparting water to the nonwoven fabric and then drying, and wherein the electret fiber sheet has a rate of increase in airflow volume after heat treatment at a temperature of 100° C. of 130% or more.

2. The electret fiber sheet according to claim 1, wherein the long fibers are formed from a thermoplastic resin mainly including a polypropylene resin.

3. An air filter medium formed from the electret fiber sheet according to claim 1.

* * * * *

UNITED STATES PATENT AND TRADEMARK OFFICE
CERTIFICATE OF CORRECTION

PATENT NO. : 11,154,803 B2  
APPLICATION NO. : 16/466347  
DATED : October 26, 2021  
INVENTOR(S) : Sachio Inaba et al.

Page 1 of 1

It is certified that error appears in the above-identified patent and that said Letters Patent is hereby corrected as shown below:

In the Claims

In Claim 1, Line 28, "woven fabric is obtained by hydrocharqinq a nonwoven" should read -- woven fabric is obtained by hydrocharging a nonwoven --

Signed and Sealed this  
Eighth Day of February, 2022

Drew Hirshfeld  
*Performing the Functions and Duties of the*  
*Under Secretary of Commerce for Intellectual Property and*  
*Director of the United States Patent and Trademark Office*